United States Patent

Rhoden et al.

[11] Patent Number: 5,062,675
[45] Date of Patent: Nov. 5, 1991

[54] ATV GUARD APPARATUS

[76] Inventors: Buddy Rhoden, Rte. 2, Box 142-C; John Singletary, Rte. 2, Box 77C, both of Ochlocknee, Ga. 31773

[21] Appl. No.: 597,500

[22] Filed: Oct. 15, 1990

[51] Int. Cl.$^5$ .............................................. B62J 25/00
[52] U.S. Cl. ..................................... 296/1.1; 280/748; 280/762
[58] Field of Search ................ 296/1.1; 293/105, 119; 280/760, 762, 748

[56] References Cited

U.S. PATENT DOCUMENTS

| | | | |
|---|---|---|---|
| 3,981,521 | 9/1976 | See | 280/760 |
| 4,168,855 | 9/1979 | Koch | 293/115 |
| 4,264,093 | 4/1981 | Long | 293/103 |
| 4,657,294 | 4/1987 | Rumpp | 293/115 |
| 4,728,121 | 3/1988 | Graves | 280/748 |

Primary Examiner—Robert R. Song
Attorney, Agent, or Firm—Leon Gilden

[57] ABSTRACT

An apparatus defining a generally "U" shaped convex structure mounted to an all-terrain vehicle, wherein the structure includes a wire grid mounted to a bottom "L" shaped framework, and the framework is provided with a rearwardly extending mounting bar for securement to an associated all-terrain vehicle. A modification of the invention includes a further guard securable to the guard during periods of non-use and mounted for extension relative thereto providing longitudinal adjustment as required.

6 Claims, 5 Drawing Sheets

PRIOR ART

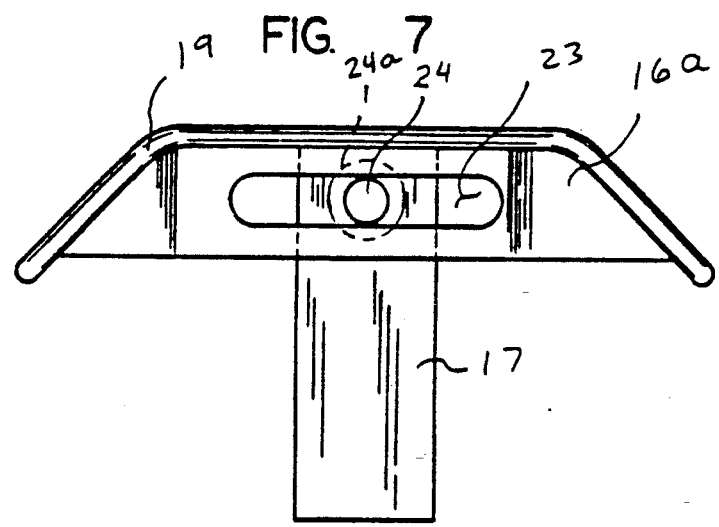
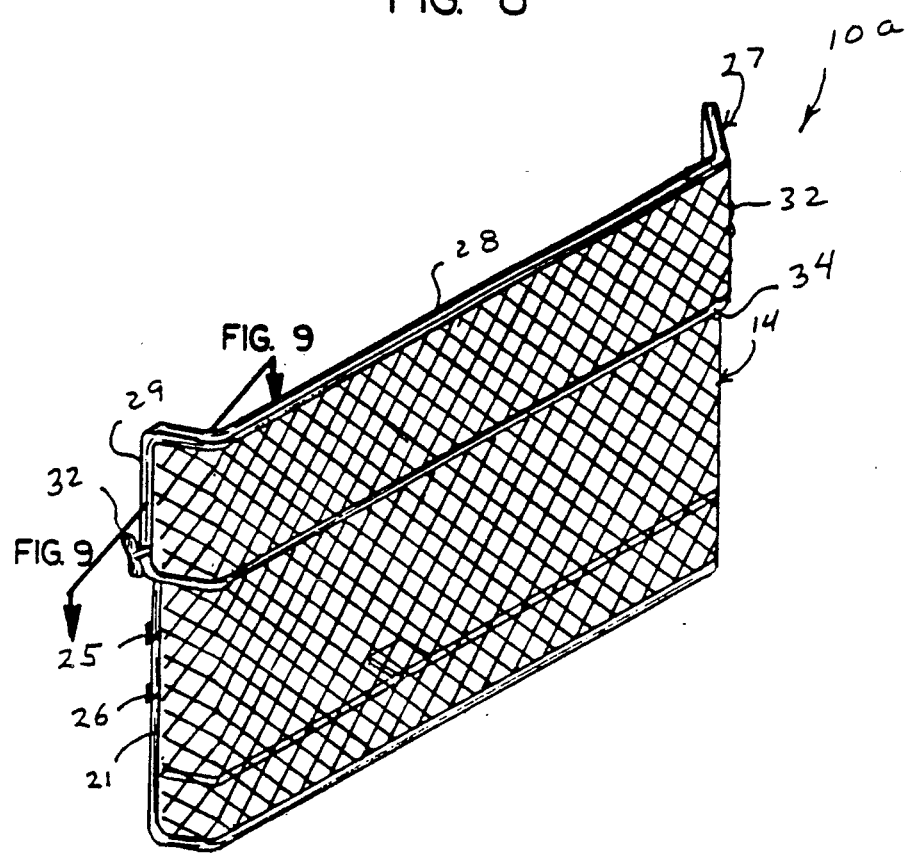

ATV GUARD APPARATUS

BACKGROUND OF THE INVENTION

1. Field of the Invention

The field of invention relates to guard structure, and more particularly pertains to a new and improved ATV guard apparatus wherein the same is mounted in association with an all-terrain vehicle for affording protection to a rider of the vehicle.

2. Description of the Prior Art

Contemporary use of all-terrain vehicles has associated hazards and dangers therewith when such vehicles are directed through brush and geographical impediments, such as to effect impact with a rider of the all-terrain vehicle (ATV). To overcome deficiencies of the prior art, an ATV guard structure is provided to afford protection to the leg portions of a rider of the vehicle. Prior art structure in utilizing guard apparatus in association with a vehicle may be found in U.S. Pat. No. 4,099,760 to Mascotte, et al. wherein a brush guard is mounted to a forward end of a utility vehicle for affording protection of the vehicle during its use.

U.S. Pat. No. 3,981,521 to See provides a brush guard attachment mounted to the sides of a tractor between the front and rear wheels utilizing deflector bars mounted to the outer extensions of the structure to deflect various vegetation from impacting a rider of the tractor.

U.S. Pat. No. 4,657,294 to Rumpp provides a front guard bar mounted to a vehicle for affording protection to the vehicle during off-road type traverse.

U.S. Pat. No. 4,264,093 to Long sets forth a bumper extension for vehicles utilizing a guard structure mounted thereon.

U.S. Pat. No. 4,168,855 to Koch sets forth a further example of a guard structure mounted to a vehicle utilizing a resilient bumper bar assembly formed of polycarbonate tubing mounted in rubber mounts.

As such, it may be appreciated that there continues to be a need for a new and improved ATV guard apparatus which addresses both the problems of ease of use as well as effectiveness in construction and in this respect, the present invention substantially fulfills this need.

SUMMARY OF THE INVENTION

In view of the foregoing disadvantages inherent in the known types of guard apparatus no present in the prior art, the present invention provides an ATV guard apparatus wherein the same provides guard structure mounted to an all-terrain vehicle for affording leg protection to a rider thereof. As such, the general purpose of the present invention, which will be described subsequently in greater detail, is to provide a new and improved ATV guard apparatus which has all the advantages of the prior art guard apparatus and none of the disadvantages.

To attain this, the present invention provides an apparatus defining a generally "U" shaped convex structure mounted to an all-terrain vehicle, wherein the structure includes a wire grid mounted to a bottom "L" shaped framework, and the framework is provided with a rearwardly extending mounting bar for securement to an associated all-terrain vehicle. A modification of the invention includes a further guard securable to the guard during periods of non-use and mounted for extension relative thereto providing longitudinal adjustment as required.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ATV guard apparatus which has all the advantages of the prior art guard apparatus and none of the disadvantages.

It is another object of the present invention to provide a new and improved ATV guard apparatus which may be easily and efficiently manufactured and marketed.

It is a further object of the present invention to provide a new and improved ATV guard apparatus which is of a durable and reliable construction.

An even further object of the present invention is to provide a new and improved ATV guard apparatus which is susceptible of a low cost of manufacture with regard to both materials and labor, and which accordingly is then susceptible of low prices of sale to the consuming public, thereby making such ATV guard apparatus economically available to the buying public.

Still yet another object of the present invention is to provide a new and improved ATV guard apparatus which provides in the apparatuses and methods of the prior art some of the advantages thereof, while simultaneously overcoming some of the disadvantages normally associated therewith.

Still another object of the present invention is to provide a new and improved ATV guard apparatus wherein the same is readily and conveniently mounted to an all-terrain vehicle between the front and rear tires thereof for affording leg protection to a rider of the vehicle with the guard utilizing an extensible member selectively mounted to the guard structure for providing enhanced protection as required during use of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an orthographic top view of the invention illustrating a modified mounting of a mounting plate adjustably securable to the framework of the guard structure.

FIG. 8 is an isometric illustration of a modified aspect of the instant invention.

DESCRIPTION OF THE PREFERRED EMBODIMENT

Figure 1:
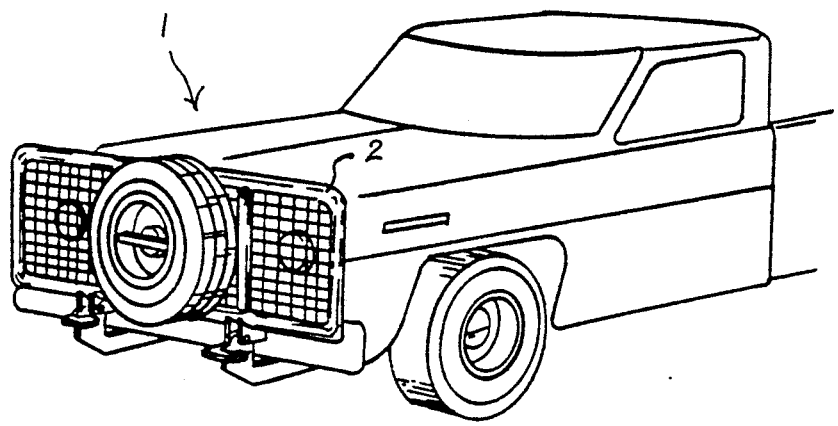
FIG. 1 is an isometric illustration of a prior art guard apparatus.

With reference now to the drawings, and in particular to FIGS. 1 to 10 thereof, a new and improved ATV guard apparatus embodying the principles and concepts of the present invention and generally designated by the reference numerals 10 and 10a will be described.

Figure 2:
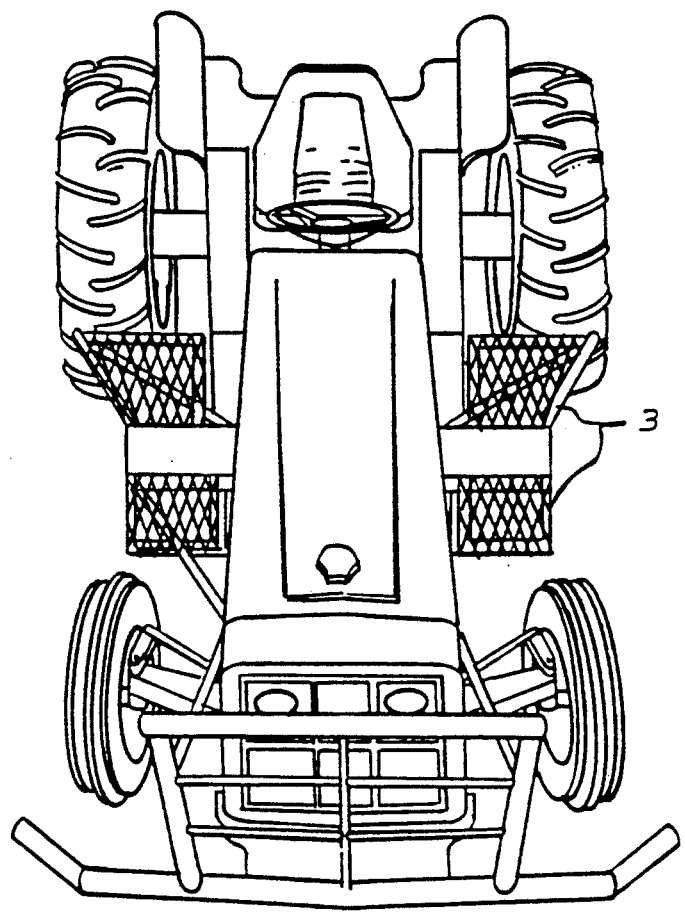
FIG. 2 is an isometric illustration of a further example of a guard apparatus utilized in a tractor construction.

FIG. 1 illustrates a prior art brush guard structure 1, wherein a framework 2 mounting a wire matrix grid therebetween of a generally planar construction affords protection to a forward end of an associated motor vehicle. FIG. 2 illustrates a further prior art guard structure 3, wherein the guard structure is positioned between the forward and rear wheels of an associated tractor to afford protection to the leg portions of an individual directing the tractor.

Figure 3:
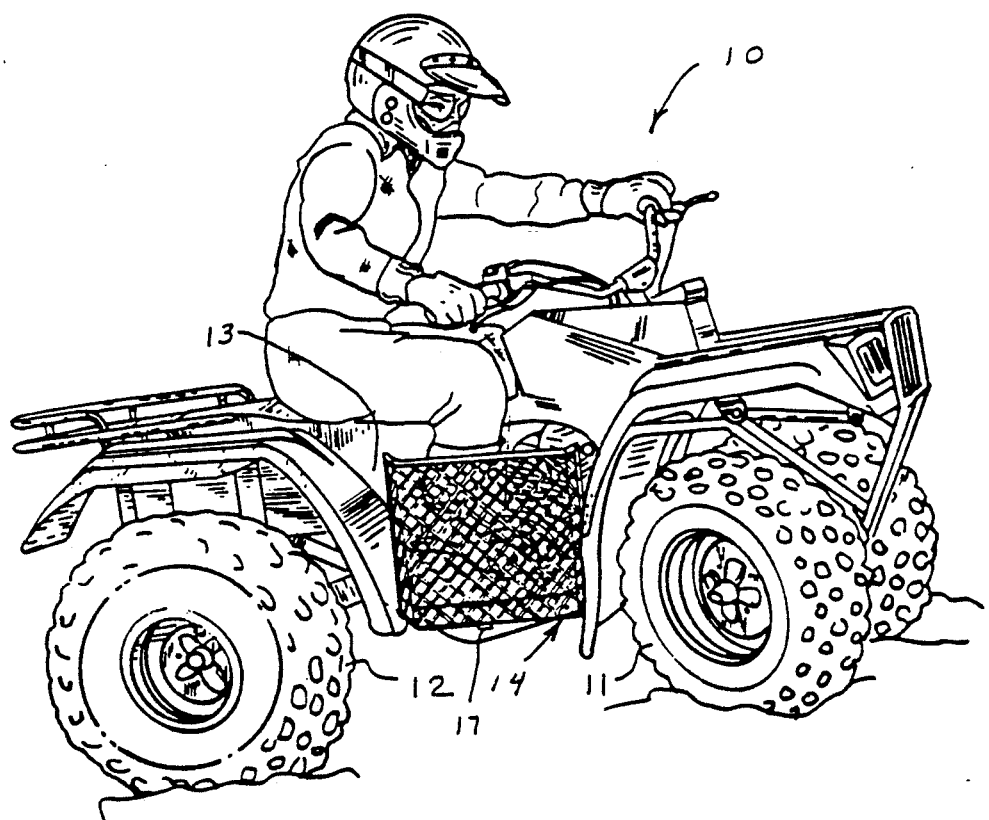
FIG. 3 is an isometric illustration of the instant invention.
Figure 4:
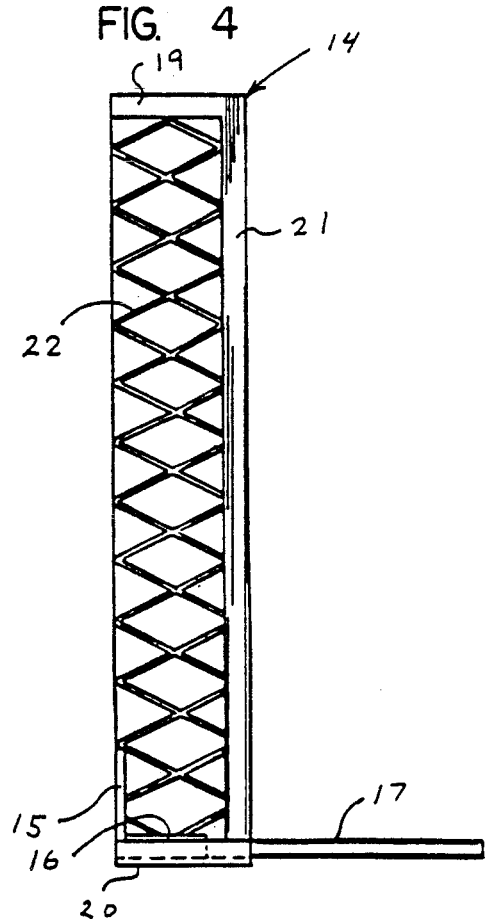
FIG. 4 is an orthographic side view, taken in elevation, of the instant invention.
Figure 5:
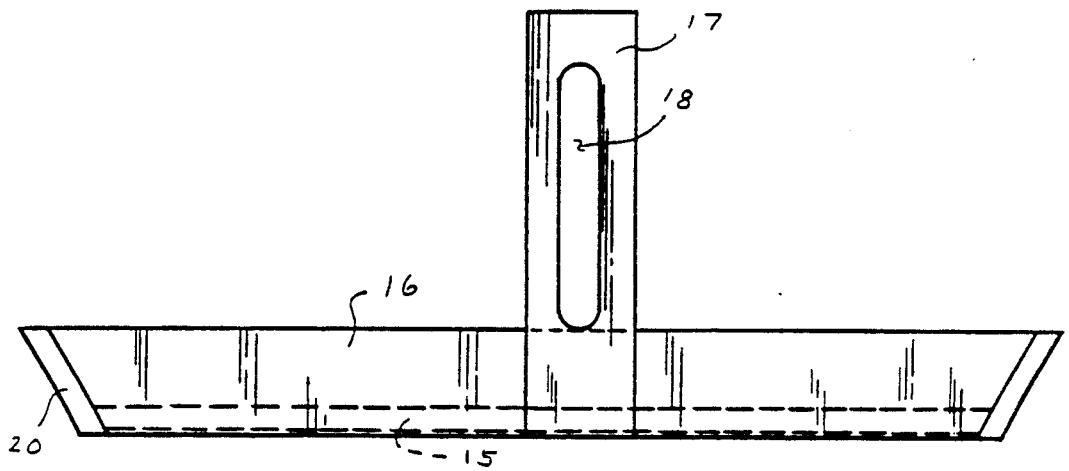
FIG. 5 is an orthographic bottom view of the instant invention.
Figure 6:
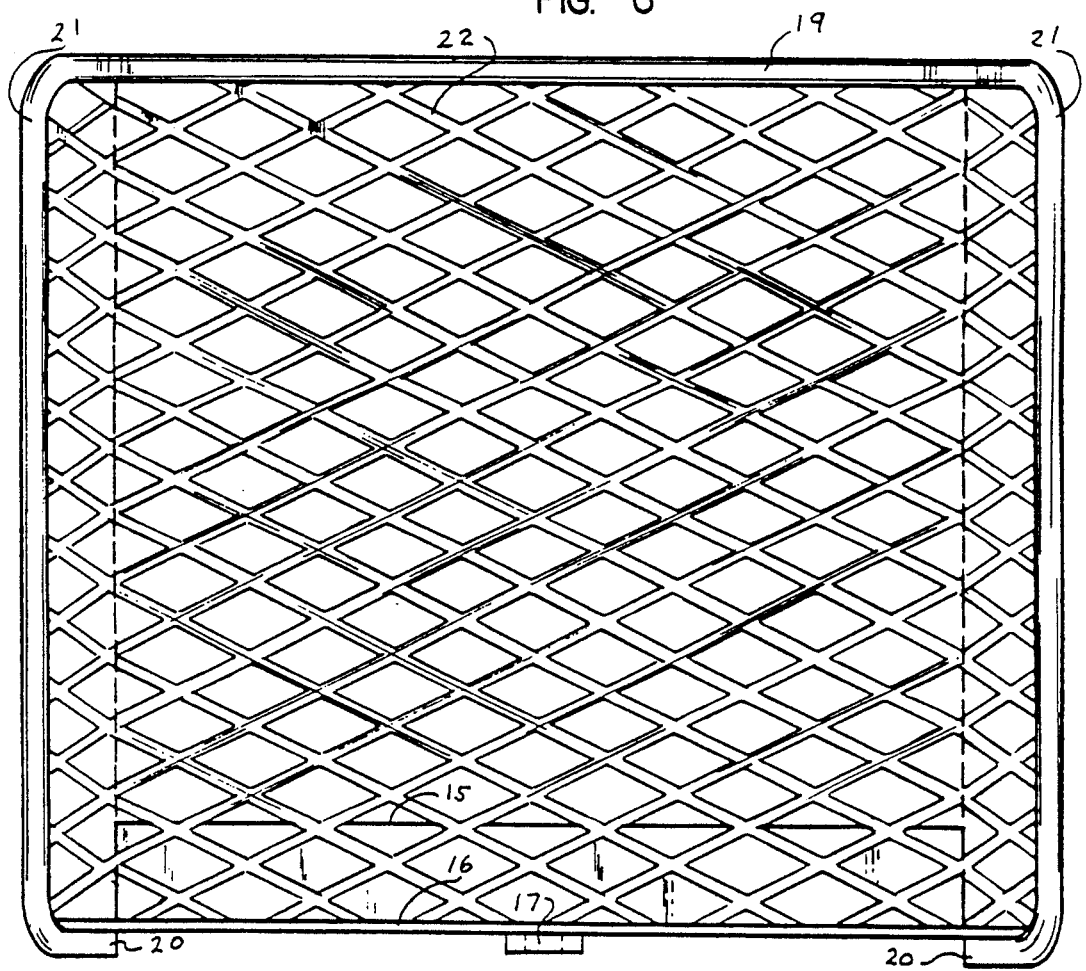
FIG. 6 is an orthographic frontal view, taken in elevation, of the instant invention.

More specifically, the ATV guard apparatus 10 of the instant invention essentially comprises an ATV vehicle, as illustrated in FIG. 3, including forward wheel members 11 and rear wheel members 12 defining a passenger leg compartment 13 therebetween. The leg compartment 13 mounts the brush guard structure of the instant invention. The brush guard structure 14 includes a vertical base plate 15 integrally, orthogonally, and coextensively mounted to a forward edge of a trapezoidal horizontal base plate 16. The horizontal base plate 16 includes a mounting plate 17 that is secured to the horizontal base plate 16 medially bisecting the base plate 16, with the mounting plate 17 orthogonally oriented relative to the vertical base plate 15. A mounting plate slot 18 is longitudinally positioned medially of the mounting plate 17 permitting adjustment in the mounting of the plate 17 to the ATV vehicle overlying the leg compartment 13. An upper "U" shaped frame bar 19 includes legs arranged at obtuse included angles to a central frame bar element, with the "U" shaped upper frame bar 19 arranged parallel to and coextensive with the trapezoidal horizontal base 16. A right and left lower frame bars 20 are mounted and secured to a bottom surface of the horizontal base plate 16 with right and left rear vertical support bars 21 each of a rectangular cross-sectional configuration extending from the right and left lower frame bars 20 to the outer terminal ends of the legs of the "U" shaped upper frame bar 19. A first "U" shaped metallic grid 22 of a generally convex configuration overlies and integrally mounts the framework defined by the upper frame bar 19, the trapezoidal horizontal base plate 16, and the right and left rear vertical support bars 21. Reference to FIG. 7 illustrates the use of an elongate base plate slot 23 formed within a modified horizontal base plate 16, with the mounting plate 17 including a mounting boss 24 orthogonally and integrally mounted adjacent a forward end of the mounting plate 17 and receivable and slidably adjustable within the slot 23 to permit angular and lateral adjustment of the framework relative to the mounting plate. A mounting boss fastener 24a is provided to fixedly secure the mounting boss 24 and associated mounting plate 17 in desired orientation relative to the mounting plate 16a.

Figure 9:
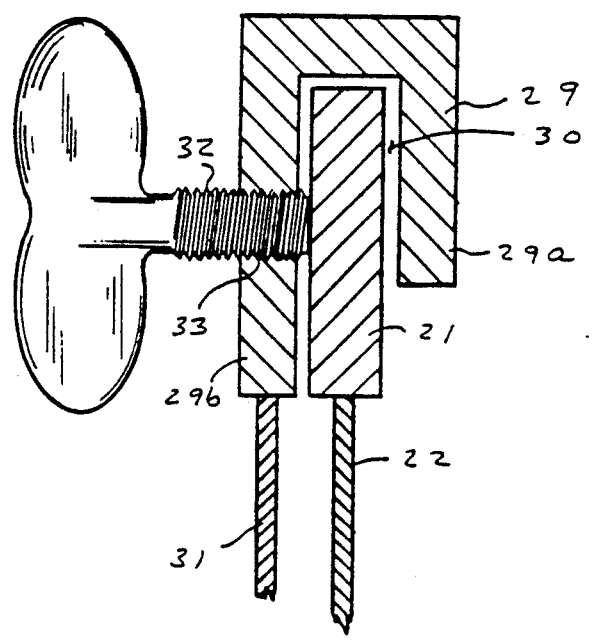
FIG. 9 is an orthographic view, taken along the lines 9—9 of FIG. 8 in the direction indicated by the arrows.
Figure 10:
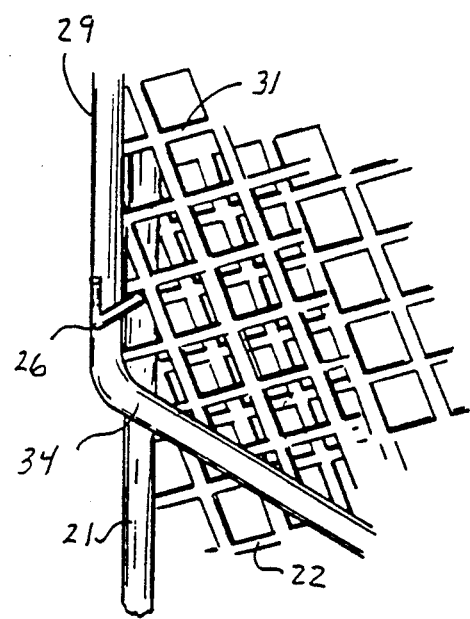
FIG. 10 is an isometric illustration utilizing the secondary brush guard positioned on the primary brush guard for support thereof when the secondary brush is in non-use.

FIGS. 8-10 illustrates the use of a modified guard apparatus 10a, wherein the brush guard 14 includes an upper guard 27. Further, the brush guard 14 includes an upper and lower support hook member 25 and 26 respectively, wherein the pair of upper and lower hook members are each mounted to each of the right and left rear vertical support bars 21, in a manner as illustrated in FIG. 8. In this manner, the upper guard 27 is supported by the pairs of upper and lower support hook members 25 and 26 during periods of non-use, as illustrated in FIG. 10 for example. When required, the upper guard 27 is mounted to the upper end of the brush guard 14 in an adjustable manner to provide an elongate guard organization when a rider of the ATV vehicle requires greater protection. The upper guard 27 includes an upper guard top "U" shaped bar 28 of a complementary configuration to that defined by the "U" shaped frame bar 19. Right and left side bars 29 are provided extending downwardly from outer terminal ends of the top "U" shaped bar 28. The right and left side bars 29 are defined by a generally "U" shaped configuration (see FIG. 9) and include an inner and outer leg 29a and 29b respectively. arranged parallel relative to one another to define a longitudinal slot 30 therebetween. The respective right and left rear vertical support bars 21 are each received within a respective longitudinal slot 30. A threaded shank fastener 32 is orthogonally directed through an associated threaded opening 33 within the outer leg 29b to fixedly secure a respective right and left rear vertical support bar 21 within the respective slot 30. A second "U" shaped grid 31 of a generally convex configuration is mounted about the framework defined by the lower upper guard bar 34 and the overlying parallel upper or top upper guard "U" shaped guard 28 and extends between the right and left side bars 29. In this manner, the upper guard 27 may be vertically positioned relative to the upper end of the brush guard 14 to afford enhanced protection to the rider.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ATV guard apparatus for securement to a vehicle, including forward and rear wheel members, wherein the apparatus is secured to the vehicle between the forward and rear wheel members to overlie a leg compartment of the vehicle, wherein the apparatus comprises,
a first framework, the framework mounting a convex shield coextensively overlying and substantially upwardly extending relative to the first framework, the first framework further including a horizontal base plate, the horizontal base plate including mounting plate secured thereto, the mounting plate including a mounting plate slot longitudinally arranged relative to the mounting plate for securement to the vehicle.

2. An ATV guard apparatus as set forth in claim 1 including a vertical base plate integrally and orthogonally mounted to a forward edge of the horizontal base plate, the horizontal base plate of a trapezoidal configuration, and the first framework including right and left rear vertical support bars extending orthogonally and upwardly relative to the horizontal base plate, with the right and left rear vertical support bars arranged parallel relative to one another, and including a "U" shaped upper frame bar, with the "U" shaped upper frame bar mounted to the right and left rear vertical support bars.

3. An ATV guard apparatus as set forth in claim 2 with the horizontal base plate including a horizontal base plate slot longitudinally and medially positioned through the horizontal base plate, and the mounting plate including a mounting plate boss orthogonally mounted integrally to the mounting plate receivable through the base plate slot, with the mounting boss selectively securable relative to the horizontal base plate to effect adjustment of the horizontal base plate relative to the mounting plate.

4. An ATV guard apparatus as set forth in claim 3 further including an upper and lower support hook member mounted to each right and left rear vertical support bar, and an upper guard including a second framework selectively securable to the support hook members in a first position and adjustably mounted to the right and left rear vertical support bars in a second position.

5. An ATV guard apparatus as set forth in claim 4 wherein the second framework includes an upper guard top "V" shaped bar complementarily configured to the "U" shaped upper frame bar, with the second framework further including a lower upper guard bar underlying and parallel to the upper guard top "U" shaped bar, and right and left upper guard side bars integrally and orthogonally mounted between the top and lower upper guard bars to define a second framework, and the right and left side bars each including an elongate longitudinal slot directed therethrough for receiving the respective right and left rear vertical support bar within a respective right and left side bar.

6. An ATV guard apparatus as set forth in claim 5 wherein each right and left side bar each includes an inner leg spaced from and parallel to an outer leg, with the inner and outer legs defining a longitudinal slot therebetween, and a threaded shank fastener threadedly receivable within a threaded opening, with the threaded opening formed within the outer leg and the threaded shank fastener directed into the longitudinal slot to effect securement of the respective right and left rear vertical support bar within a respective right and left side bar.

* * * * *